(12) United States Patent
 Hsieh

(10) Patent No.: US 10,907,815 B1
(45) Date of Patent: Feb. 2, 2021

(54) DIGITAL LED CONTROLLER

(71) Applicant: Illinois Tool Works Inc., Glenview, IL (US)

(72) Inventor: Hung-Chin Hsieh, Hsin Chu (TW)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/527,431

(22) Filed: Jul. 31, 2019

(51) Int. Cl.
 *F21V 23/00* (2015.01)
 *G05B 19/042* (2006.01)

(52) U.S. Cl.
 CPC ........ *F21V 23/003* (2013.01); *G05B 19/0425* (2013.01)

(58) Field of Classification Search
 None
 See application file for complete search history.

(56) References Cited

U.S. PATENT DOCUMENTS

| | | | | |
|---|---|---|---|---|
| 5,329,431 | A * | 7/1994 | Taylor ................ | G05B 19/0421 362/85 |
| 10,327,314 | B1 * | 6/2019 | Shin ........................ | H04W 4/70 |
| 2003/0057886 | A1 * | 3/2003 | Lys ............................ | F21S 4/10 315/291 |
| 2005/0116667 | A1 * | 6/2005 | Mueller .................. | E04F 13/08 315/312 |
| 2006/0227798 | A1 | 10/2006 | Hou et al. | |
| 2008/0136334 | A1 * | 6/2008 | Robinson ............... | H05B 47/18 315/151 |
| 2017/0188438 | A1 * | 6/2017 | Vollmer .................. | H05B 47/19 |
| 2018/0035505 | A1 * | 2/2018 | Foster .................. | H04L 12/2836 |
| 2018/0225075 | A1 * | 8/2018 | Park ...................... | G09G 3/3233 |

FOREIGN PATENT DOCUMENTS

| | | |
|---|---|---|
| EP | 2 953 021 A1 | 12/2015 |
| WO | 01/82657 A1 | 11/2001 |
| WO | 2015/155266 A1 | 10/2015 |
| WO | 2016/001861 A1 | 1/2016 |

OTHER PUBLICATIONS

The extended European search report for Application No. 20186426.1, dated Dec. 4, 2020, pp. 1-9, European Patent Office, Germany.

* cited by examiner

*Primary Examiner* — Crystal L Hammond
(74) *Attorney, Agent, or Firm* — McAndrews, Held & Malloy, Ltd.

(57) ABSTRACT

A controller for an illumination device is provided. The controller may comprise a data input module configured to receive an input signal, a determining module, with at least one data format stored thereon for driving at least one type of LED device, wherein the determining module is configured to determine whether the input signal received from the data input module belongs to the at least one data format and generate an output signal based on the input signal, and a data output module configured to drive the illumination device based on the output signal received from the determining module. The controller may further comprise a command input module configured to receive a command from a user. A method for controlling an illumination device and one or more computer-readable storage media storing computer-executable instructions, that when being executed, cause a controller to perform the above method are provided.

21 Claims, 4 Drawing Sheets

DIGITAL LED CONTROLLER

FIELD

This disclosure is related to digital LED controller.

BACKGROUND

In the digital LEDs manufacturer industries, many different formats or standards exist for controlling the data sequence of digital LED. When the user purchases different types of digital LEDs from different manufacturers, he or she also needs to replace the whole set of controllers to adapt the new digital LEDs. The reconfiguration of the hardware settings or reinstallation of the software for meeting different types of digital LEDs' data communication sequence is troublesome to the users. Therefore, there's a need in the field to develop new and effective digital LED controllers.

SUMMARY

Embodiments of the present disclosure generally relate to a controller for an illumination device. The controller may comprise a data input module configured to receive an input signal, a determining module, with at least one data format stored thereon for driving at least one type of LED device, wherein the determining module is configured to determine whether the input signal received from the data input module belongs to the at least one data format and generate an output signal based on the input signal, and a data output module configured to drive the illumination device based on the output signal received from the determining module. The controller may further comprise a command input module configured to receive a command from a user. The at least one data format is stored on the determining module prior to receiving the input signal from the data input module, or the at least one data format is constructed on the determining module during receiving the command on the command input module. The determining module may further comprise a converting module for converting the input signal into the output signal, which drives the type of LED device of the illumination device.

In another embodiment, a method for controlling an illumination device is disclosed. The method may comprise receiving, by a data input module, an input signal; determining, by a determining module, whether the input signal received from the data input module belongs to the at least one data format and generate an output signal based on the input signal, wherein the determining module is configured with at least one data format stored thereon for driving at least one type of LED device, and driving, by a data output module, the illumination device based on the output signal received from the determining module. The method may further comprise receiving, by a command input module, a command from a user, wherein the at least one data format is stored on the determining module prior to receiving the input signal from the data input module or the at least one data format is constructed on the determining module during receiving the command on the command input module. The method may further comprise converting, by a converting module, the input signal into the output signal, which drives the type of LED device of the illumination device.

In still another embodiment, one or more computer-readable storage media storing computer-executable instructions, that when being executed, cause a controller to perform the method above-recited is disclosed.

The above and other embodiments of the present disclosure are described in more details in the following contexts.

BRIEF DESCRIPTION OF THE DRAWINGS

So that the manner in which the above described features of the present disclosure can be understood, a more specific description of the disclosure, briefly summarized above, may be had by reference to embodiments, some of which are illustrated in the appended drawings. However, the appended drawings only illustrate exemplary embodiments of this disclosure. It is to be understood that the disclosure may admit to other equally effective embodiments, and therefore the appended drawings should not be considered as limiting the scope of the present disclosure.

To facilitate understanding, identical reference numerals have been used, where possible, to designate identical elements that are common in the figures. For the sake of clarity, the various embodiments shown in the figures are not necessarily drawn to scale and are illustrative representations.

DETAILED DESCRIPTION

Now the embodiments of the present disclosure will be described in details with reference to the drawings.

Figure 1:
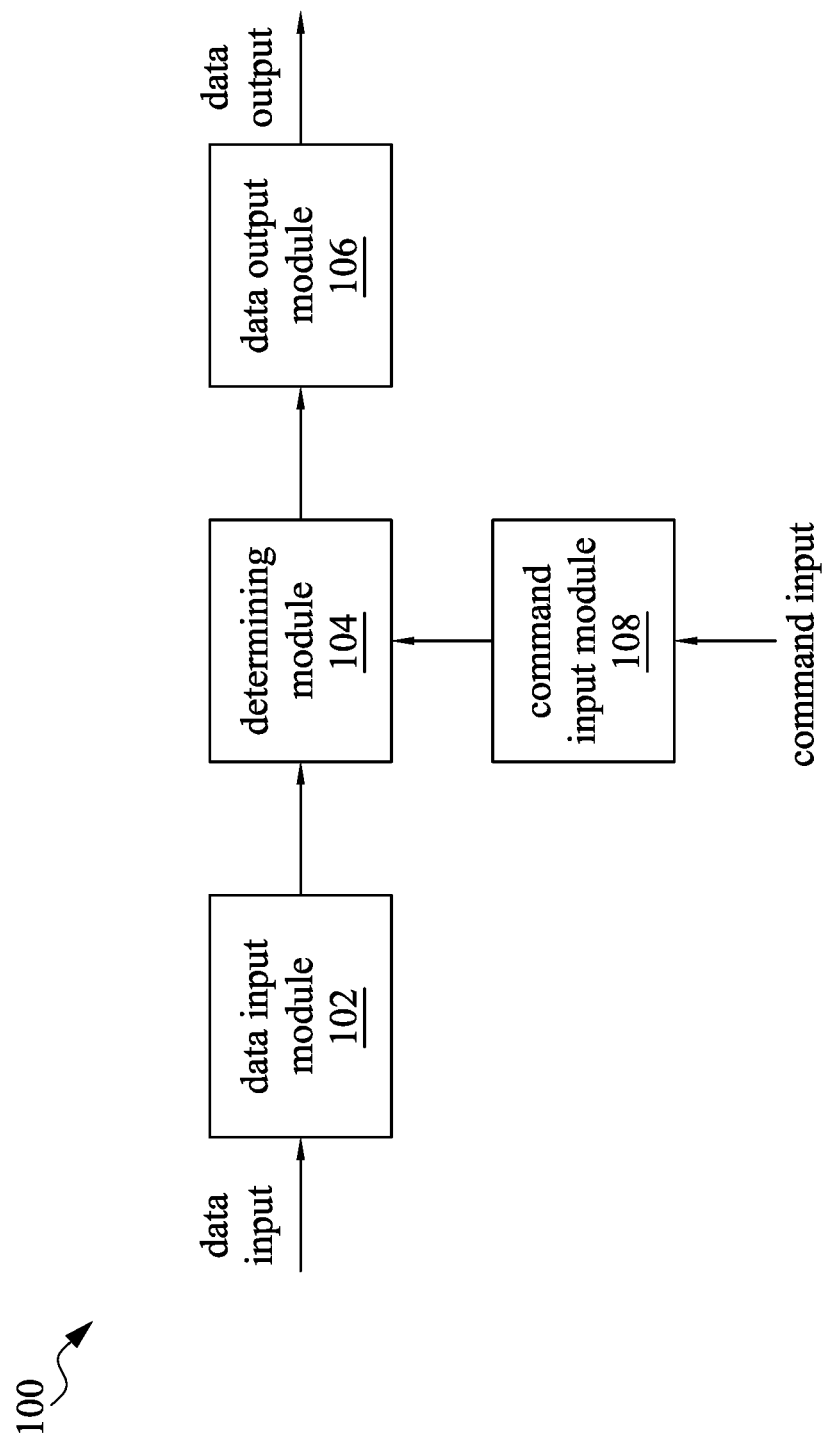
FIG. 1 illustrates a block diagram of a controller for an illumination device according to an embodiment of the present disclosure.

FIG. 1 illustrates a block diagram of a controller 100 for an illumination device according to an embodiment of the present disclosure. As shown in FIG. 1, the controller 100 may include a data input module 102, a determining module 104, a data output module 106, and a command input module 108.

The data input module 102 is configured to receive an input signal and send the input signal to the determining module 104. The input signal is transmitted from a computing system to the data input module 102. The computing system can be any kind of physical computing system with a communicating interface, such as a desktop computer, laptop computer, mobile device, tablet computer, microprocessor, Application-specific integrated circuit (ASIC), System on a Chip (SoC), Field Programmable Gate Array (FPGA), and the like.

The determining module 104 may store one or more data format for driving different types of LED device, and is configured to determine whether the input signal received from the data input module belongs to the data format for driving the existing type of LED device, and then generate an output signal based on the input signal. That is, the determining module 104 may reformat the input signal based on the data format to generate the output signal. Then, the determining module 104 sends the output signal to the data output module 106. Conversely, if the determining module 104 determines that the input signal received from the data input module belongs to the data format for driving the existing type of LED device, the determining module 104 will bypass the input signal as an output signal to the data output module 106.

The data output module 106 receives the output signal from the determining module 104, and is configured to output the output signal to drive the illumination device. In such way, the input signal transmitted by the computing system may drive the illumination device through the controller 100.

Figure 2:
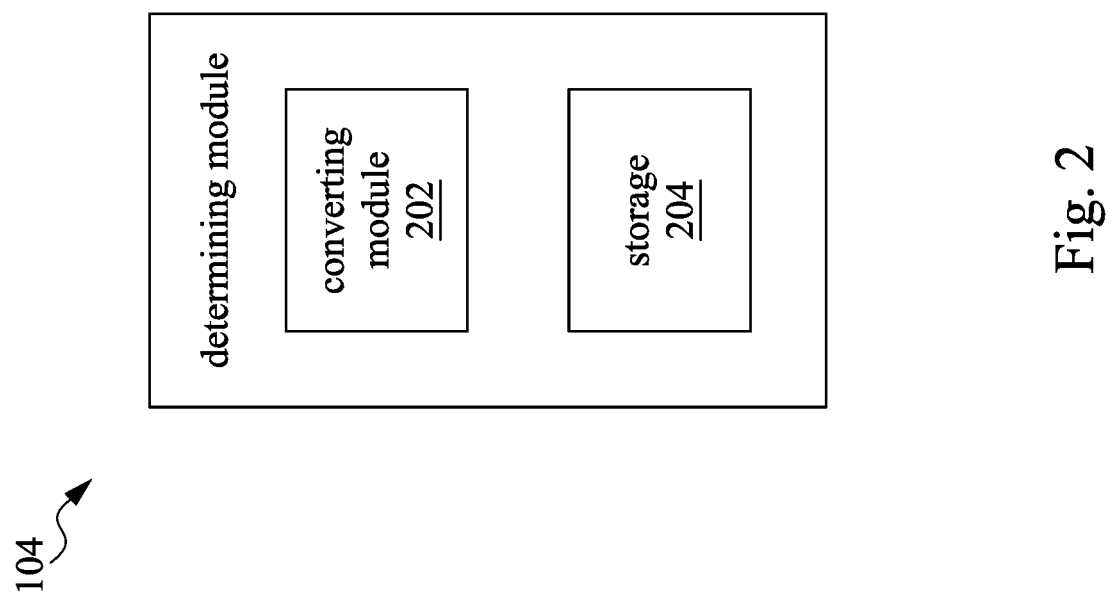
FIG. 2 illustrates a block diagram of the determining module of the controller of FIG. 1.

As shown in FIG. 1, the command input module 108 may be communicably coupled to the determining module 104, and may receive a command from a user. The command input module 108 is able to construct one or more data format on the determining module 104 based the user's command. In one embodiment, there is no data format stored on the determining module 104 prior to receiving the command on the command input module 108, and the command input module 108 may construct the one or more data format on the determining module 104 based on the user's command. In another embodiment, one or more default data format is stored on the determining module 104 in advance. Upon receiving the command on the command input module 108, the command input module 108 may re-construct one or more data format on the determining module 104 based the user's command In such way, the user may re-construct one or more data format in the controller by the command to adapt for all different types of digital LEDs FIG. 2 illustrates a block diagram of the determining module 104 of the controller 100 of FIG. 1. In one embodiment, the determining module 104 may further include a converting module 202 and a storage 204. The converting module 202 is configured to convert the input signal into the output signal, which drives the existing type of LED device of the illumination device. The storage 204 may store a first data format used to drive a first type of LED device and a second data format used to drive a second type of LED device. When the illumination device only includes the second type of LED device, the determining module 104 may determine whether the input signal belongs to the second data format. If the input signal is determined different from the second data format by the determining module 104, the converting module 202 may convert the input signal into the second data format. Conversely, when the illumination device only includes the first type of LED device, the determining module 104 may determine whether the input signal belongs to the first data format. If the input signal is determined different from the first data format by the determining module 104, the converting module 202 may convert the input signal into the first data format. In such way, the user may change the type of the LED device without reconfiguring the hardware setting or reinstalling the software to meet the new type of the LED device.

In one embodiment, there is no data format stored on the storage 204 prior to receiving the command on the command input module 108, and the command input module 108 may construct the first data format and the second data format on the storage 204 based on the command. In another embodiment, the first default data format and the second default data format are stored on the storage 204 in advance. Upon receiving the command on the command input module 108, the command input module 108 may re-construct the first data format and the second data format on the storage 204 based the command. Usually, the data format for driving the conventional LED may be single-signal type or dual-signal type. The single-signal type also refers to a signal that can be decoded without the need for a separate clock signal, and the dual-signal type refers to a signal that can be decoded with the need for a separate clock signal. In one embodiment, the first data format may include a clock signal and a data signal, and the second data format may include a data signal without a clock signal. In another embodiment, the first data format may include a data signal without a clock signal, and the second data format may include a clock signal and a data signal. In still another embodiment, both the first data format and the second data format may include a data signal without a clock signal. In still another embodiment, both the first data format and the second data format may include a data signal and a clock signal. In such way, the user may change one LED device driven by a clock signal and a data signal to another LED device driven by a data signal without a clock signal, and vice versa.

Figure 3:
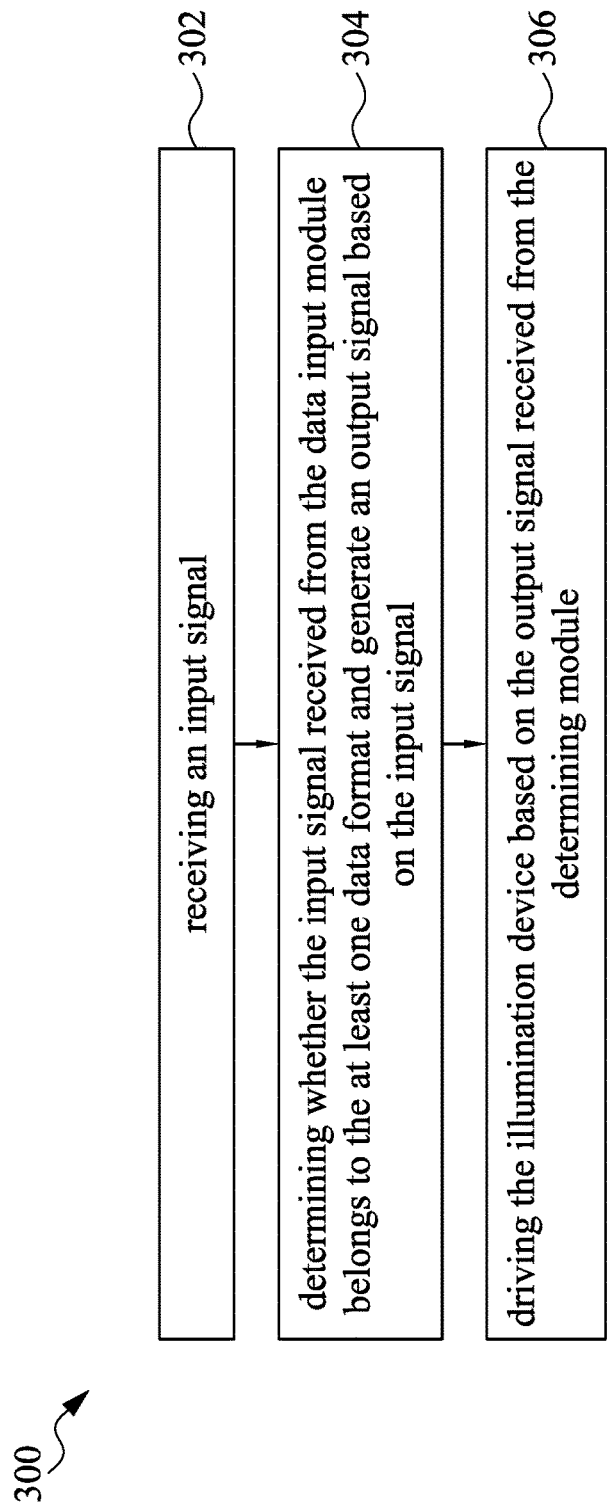
FIG. 3 is a flow diagram illustrating a method for controlling an illumination device according to an embodiment of the present disclosure.

FIG. 3 is a flow diagram illustrating a method 300 for controlling an illumination device according an embodiment of the present disclosure with the controller 100 of FIG. 1. As shown, the method 300 begins with step 302, wherein the data input module 102 of the controller 100 may receive an input signal from a computing system. The input signal is then transmitted from the data input module 102 to the determining module 104. Next, at step 304, the determining module 104 of the controller 100 may determine whether the input signal received from the data input module 102 belongs to the at least one data format and generate an output signal based on the input signal. As stated above with reference to FIG. 1, the determining module 104 is configured with at least one data format stored thereon for driving at least one type of LED device. In one embodiment, the at least one data format is stored on the determining module 104 prior to receiving the input signal from the data input module 102. After the determining module 104 generates the output signal, it passes the output signal to the data output module 106. At step 306, the data output module 106 may drive the illumination device based on the output signal received from the determining module 104.

Figure 4:
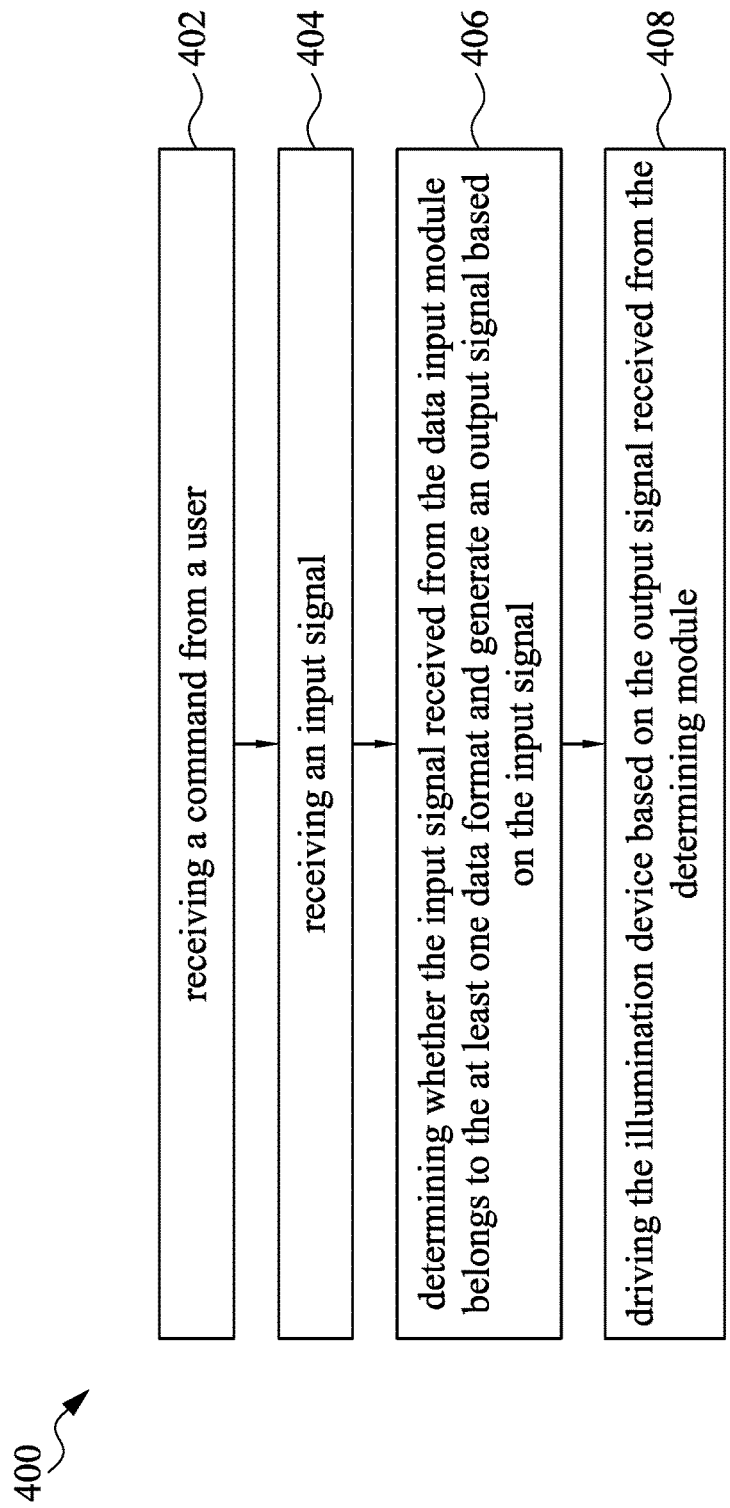
FIG. 4 is a flow diagram illustrating another method for controlling an illumination device according to an embodiment of the present disclosure.

FIG. 4 is a flow diagram illustrating another method 400 for controlling an illumination device according an embodiment of the present disclosure with the controller 100 of FIG. 1. As shown, the method 400 begins with step 402, wherein the command input module 108 of the controller 100 may receive a command from a user. There is no data format stored on the determining module 104 prior to receiving the command on the command input module 108, and the command input module 108 may construct the at least one data format on the determining module 104 based the command. At step 404, the data input module 102 of the controller 100 may receive an input signal from a computing system. The input signal is then transmitted from the data input module 102 to the determining module 104. Next, at step 406, the determining module 104 of the controller 100 may determine whether the input signal received from the data input module 102 belongs to the at least one data format and generate an output signal based on the input signal. As stated above with reference to FIG. 1, the determining module 104 is configured with at least one data format stored thereon for driving at least one type of LED device. After the determining module 104 generates the output signal, it passes the output signal to the data output module 106. At step 408, the data output module 106 may drive the illumination device based on the output signal received from the determining module 104.

As described herein, the computing system may include a central processing unit (CPU), a memory, and a storage device. The computing system may also include an I/O device interface connecting I/O devices (e.g., keyboard, mouse, and display devices) to the computing system. The CPU extracts and executes programming instructions stored in the memory. A bus can be used to transmit programming instructions between the CPU, the I/O device interface, the storage device, and the memory. The CPU may be a single CPU, multiple CPUs, a single CPU with multiple processing cores, and the likes. Memory may be a random access memory. Storage may be a disk drive storage device or a combination of fixed and/or removable storage devices, such as fixed disc drives, removable memory cards, or optical storage.

In still another embodiment, one or more computer-readable storage media storing computer-executable instructions, that when being executed, cause a controller 100 to perform the method 300, 400 is disclosed.

As will be understood by one skilled in the art, aspects of the present disclosure may be embodied as a system, method or computer program product. Accordingly, aspects of the present disclosure may take the form of an entirely hardware embodiment, an entirely software embodiment (including firmware, software, micro-code, etc.) or an embodiment combining software and hardware. Furthermore, aspects of the present disclosure may take the form of a computer program product embodied in one or more computer readable mediums having computer readable program code embodied thereon.

The computer readable medium may be a computer readable storage medium. A computer readable storage medium may be, for example, but not limited to, an electronic, magnetic, optical, electromagnetic, infrared, or semiconductor system, apparatus, or device, or any suitable combination thereof. More specific examples of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In addition, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, C#, Smalltalk, C++ or the likes and conventional procedural programming languages, such as the "C" programming language or similar programming languages. The program code may execute entirely on the user's computer, partly on the user's computer, or partly on the user's computer and partly on a remote computer.

Aspects of the present disclosure are described above with reference to flowchart and block diagrams of methods, apparatus and computer program products according to embodiments of the disclosure. It will be understood that each block of the flowchart and block diagrams, and combinations of blocks in the flowchart and block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the flowchart and block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function specified in the flowchart and block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, executed in parallel, or the blocks may sometimes be executed in the reverse order, depending upon the functionality involved. It will also be noted that each block of the block diagrams and flowchart illustration, and combinations of blocks in the block diagrams and flowchart illustration, can be implemented by special purpose hardware-based systems that perform the specified functions or acts or carry out combinations of special purpose hardware and computer instructions.

Although the disclosure herein has been described with reference to particular embodiments, those skilled in the art will understand that the embodiments described are merely illustrative of the principles and applications of the present disclosure. It will be apparent to those skilled in the art that various modifications and variations can be made to the method and apparatus of the present disclosure without departing from the spirit and scope of the disclosure. Thus, the present disclosure can include modifications and variations that are within the scope of the appended claims and their equivalents.

What is claimed is:

1. A controller for an illumination device, comprising:
a data input module configured to receive an input signal;
a determining module, with at least one data format stored thereon for driving at least one type of LED device, wherein the determining module is configured to determine whether the input signal received from the data input module belongs to the at least one data format and generate an output signal based on the input signal, wherein the determining module is configured to pass the input signal through as the output signal if the determining module determines that the input signal belongs to the at least one data format; and
a data output module configured to drive the illumination device based on the output signal received from the determining module.

2. The controller according to claim 1, wherein the at least one data format is stored on the determining module prior to receiving the input signal from the data input module.

3. The controller according to claim 1, further comprising a command input module configured to receive a command from a user, wherein the at least one data format is constructed on the determining module during receiving the command on the command input module.

4. The controller according to claim 1, wherein the determining module further comprises a converting module for converting the input signal into the output signal, which drives the type of LED device of the illumination device.

5. The controller according to claim 4, wherein the determining module stores a first data format used to drive a first type of LED device and a second data format used to drive a second type of LED device; and
 in case that the illumination device only includes the second type of LED device, the determining module determines whether the input signal belongs to the second data format.

6. The controller according to claim 5, wherein the converting module converts the input signal into the second data format if the input signal is determined different from the second data format by the determining module.

7. The controller according to claim 6, wherein the first data format comprises a clock signal and a data signal.

8. The controller according to claim 7, wherein the second data format comprises a data signal without a clock signal.

9. The controller according to claim 6, wherein the second data format comprises a clock signal and a data signal.

10. The controller according to claim 9, wherein the first data format comprises a data signal without a clock signal.

11. A method for controlling an illumination device, comprising:
 receiving, by a data input module, an input signal;
 determining, by a determining module, whether the input signal received from the data input module belongs to the at least one data format and generate an output signal based on the input signal, wherein the determining module is configured with at least one data format stored thereon for driving at least one type of LED device;
 passing the input signal through as the output signal if the input signal belongs to the at least one data format; and
 driving, by a data output module, the illumination device based on the output signal received from the determining module.

12. The method according to claim 11, wherein the at least one data format is stored on the determining module prior to receiving the input signal from the data input module.

13. The method according to claim 11, further comprising receiving, by a command input module, a command from a user, wherein the at least one data format is constructed on the determining module during receiving the command on the command input module.

14. The method according to claim 11, wherein the determining step further comprises converting, by a converting module, the input signal into the output signal, which drives the type of LED device of the illumination device.

15. The method according to claim 14, wherein the determining module stores a first data format used to drive a first type of LED device and a second data format used to drive a second type of LED device; and
 in case that the illumination device only includes the second type of LED device, the determining module determines whether the input signal belongs to the second data format.

16. The method according to claim 15, wherein the converting module converts the input signal into the second data format if the input signal is determined different from the second data format by the determining module.

17. The method according to claim 16, wherein the first data format comprises a clock signal and a data signal.

18. The method according to claim 17, wherein the second data format comprises a data signal without a clock signal.

19. The method according to claim 16, wherein the second data format comprises a clock signal and a data signal.

20. The method according to claim 19, wherein the first data format comprises a data signal without a clock signal.

21. A controller for a light emitting diode (LED) device in an illumination device, comprising:
 a data input module configured to receive an input signal;
 a determining module configured to determine whether the input signal belongs to a data format for driving the LED device and to generate an output signal based on the input signal,
  wherein the determining module comprises a library of different data formats to drive a plurality of different types of LED devices, and
  wherein the determining module is configured to pass the input signal through as the output signal if the determining module determines that the input signal belongs to the data format;
 a converting module operatively coupled to the determining module and configured to convert the input signal into the data format to drive the LED device of the illumination device if the input signal is determined to be different from the data format by the determining module; and
 a data output module configured to drive the illumination device based on the output signal received from the determining module.

* * * * *